(12) United States Patent
Suhara et al.

(10) Patent No.: US 6,195,251 B1
(45) Date of Patent: Feb. 27, 2001

(54) ELECTRODE ASSEMBLY AND ELECTRIC DOUBLE LAYER CAPACITOR HAVING THE ELECTRODE ASSEMBLY

(75) Inventors: Manabu Suhara; Kazuya Hiratsuka; Katsuji Ikeda; Takeshi Kawasato; Yoshiaki Higuchi; Naoki Yoshida; Naruaki Tomita, all of Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/170,278

(22) Filed: Oct. 13, 1998

(30) Foreign Application Priority Data

Oct. 29, 1997 (JP) .................................................... 9-297516
Mar. 31, 1998 (JP) .................................................. 10-087048

(51) Int. Cl.$^7$ ................................. H01G 9/00; H01G 9/02
(52) U.S. Cl. .......................... 361/502; 361/504; 361/508
(58) Field of Search ..................................... 361/500, 502, 361/503, 504, 505, 508, 509, 516, 511, 512, 513, 514, 515

(56) References Cited

U.S. PATENT DOCUMENTS

| | | | | |
|---|---|---|---|---|
| 2,079,516 | * | 5/1937 | Lilienfeld | 361/529 |
| 4,327,400 | * | 4/1982 | Muranaka et al. | 361/502 |
| 4,343,686 | * | 8/1982 | Hebert, Jr. et al. | 205/644 |
| 4,709,303 | * | 11/1987 | Fujiwara et al. | 361/502 |
| 4,763,229 | * | 8/1988 | Ohtuka et al. | 361/529 |
| 4,862,328 | | 8/1989 | Morimoto et al. | |
| 5,072,335 | * | 12/1991 | Kurabayashi et al. | 361/502 |
| 5,150,283 | * | 9/1992 | Yoshida et al. | 361/502 |
| 5,194,127 | * | 3/1993 | Endoh et al. | 361/500 |
| 5,449,441 | * | 9/1995 | Amor et al. | 205/659 |
| 5,953,204 | * | 9/1999 | Suhara et al. | 361/502 |
| 5,956,225 | * | 9/1999 | Okuyama et al. | 361/502 |

FOREIGN PATENT DOCUMENTS 1-230216 * 9/1989 (JP) .............................. H01G/9/00

* cited by examiner

Primary Examiner—Kristine Kincaid
Assistant Examiner—Eric Thomas
(74) Attorney, Agent, or Firm—Oblon, Spivak, McClelland, Maier & Neustadt, P.C.

(57) ABSTRACT

An electrode assembly for an electric double layer capacitor, including a current collector made of an aluminum foil, and an electrode including a carbonaceous material having a specific surface area of at least 500 $m^2/g$ and a binder, bonded on at least one side of the current collector, wherein the aluminum foil has a roughened layer having a thickness of from 0.5 to 5 $\mu m$ on the surface of the side bonded to the electrode and has a breaking energy of at least 3 kg·mm with a dumbbell specimen of No. 1 form as stipulated in JIS K6301.

20 Claims, No Drawings

ELECTRODE ASSEMBLY AND ELECTRIC DOUBLE LAYER CAPACITOR HAVING THE ELECTRODE ASSEMBLY

BACKGROUND OF THE INVENTION

1. Field of the Invention

The present invention relates to an electric double layer capacitor, particularly an electric double layer capacitor excellent in the operation reliability and an electrode assembly and a current collector therefor.

2. Discussion of Background

The electric double layer capacitor is based on a principle to store electric charge in an electric double layer formed at the interface between an electrode and an electrolyte. In order to improve the capacitance density of an electric double layer capacitor, it is common to employ for the electrode, a carbonaceous material such as activated carbon or carbon black having a high specific surface area or fine particles of a metal or conductive metal oxide. For efficient charging and discharging, the electrode is bonded to a current collector made of a foil or a layer having low resistance, such as a metal or graphite. As the current collector, it is common to employ a valve metal such as aluminum or a stainless steel such as SUS304 or SUS316L, which is electrochemically highly corrosion resistant.

As an electrolyte for the electric double layer capacitor, an organic electrolyte and an aqueous electrolyte are available. However, an attention has been drawn to an electric double layer capacitor employing an organic electrolyte, as the operating voltage is high, and the energy density in the charged state can be made high. In a case where an organic electrolyte is employed, if water is present in the cell of an electric double layer capacitor, the performance tends to deteriorate due to electrolysis of the water. Accordingly, the electrode is required to have water sufficiently removed, and it is common to apply drying treatment by heating under reduced pressure. As the electrode for an electric double layer capacitor, activated carbon is mainly used as the main component. However, active carbon is usually in a powder form. Accordingly, it is common to mix it with a binder containing a fluorine-containing resin such as polytetrafluoroethylene (hereinafter referred to as PTFE), followed by molding into an electrode of a sheet form, which is then electrically connected to a current collector via a conductive adhesive layer to form an electrode assembly. In order to improve the adhesion between the current collector and the electrode made of a carbonaceous material, JP-A-57-60828 or JP-A-57-84120 proposes an electrode assembly using a highly etched aluminum foil as a current collector. When such a highly etched aluminum foil is used as a current collector, and it is dipped in a slurry comprising a carbonaceous material such as active carbon, a binder and a solvent, or coated with such a slurry, followed by drying to obtain an electrode assembly, the adhesion will be improved over a case where a smooth aluminum foil or an aluminum foil having the surface roughened by e.g. sand blasting, is used. However, the obtained electrode assembly has poor strength and is likely to break in the process for producing the electrode assembly or in the process for preparing a capacitor by laminating the electrode assembly and a separator.

Further, it has been proposed to use an etched foil for an aluminum electrolytic capacitor, as the current collector for an electric double layer capacitor. However, the foil for an aluminum electrolytic capacitor is intended, as the basic purpose of the product, to have a strength sufficient to be rolled together with a separator and to provide a high capacitance. Whereas, the current collector for an electric double layer capacitor is required to have a high bonding strength with an electrode composed mainly of a carbonaceous material and to have a strength durable in various process steps for forming an electrode assembly by integrating it with the electrode, which is essentially different from the basic purpose of the foil for an aluminum electrolytic capacitor. Accordingly, even if the foil for an aluminum electrolytic capacitor is used for a current collector of an electric double layer capacitor, good properties as an electric double layer capacitor can hardly be obtained, and the productivity will also be poor.

SUMMARY OF THE INVENTION

In order to increase the power density and to secure the durability for charging and discharging cycles, it is important to increase the bond strength between the metal current collector and the electrode comprising a carbonaceous material and a binder and to reduce the electric resistance of the electrode assembly in an electrolyte, particularly when used under a severe condition, for example, in an application for an electric car or an engine-electric double layer capacitor hybrid car.

It is accordingly an object of the present invention to provide an electric double layer capacitor having a large capacitance and excellent durability for charging and discharging cycles, wherein the strength of the current collector is high, and the bond strength between the current collector and the electrode is high.

The present invention provides an electrode assembly for an electric double layer capacitor, comprising a current collector made of an aluminum foil, and an electrode comprising a carbonaceous material having a specific surface area of at least 500 $m^2/g$ and a binder, bonded on at least one side of the current collector, wherein said aluminum foil has a roughened layer having a thickness of from 0.5 to 5 $\mu m$ on the surface on the side bonded to the electrode and has a breaking energy of at least 3 kg·mm with a dumbbell specimen of No. 1 form as stipulated in JIS K6301; and an electric double layer capacitor having such an electrode assembly.

Further, the present invention provides an electrode assembly for an electric double layer capacitor, comprising a current collector made of an aluminum foil, and an electrode comprising a carbonaceous material having a specific surface area of at least 500 $m^2/g$ and a binder, bonded on at least one side of the current collector, wherein said aluminum foil comprises a non-roughened portion having a thickness of from 8 to 50 $\mu m$ and a roughened layer having a thickness of from 0.5 to 5 $\mu m$ formed on one side or each side thereof; and an electric double layer capacitor having such an electrode assembly.

DETAILED DESCRIPTION OF THE PREFERRED EMBODIMENTS

In this specification, one having an electrode comprising a carbonaceous material and a binder, integrated with a current collector, is referred to as an electrode assembly, and when used on a positive electrode side, the electrode assembly will be referred to as a positive electrode assembly, and when used on a negative electrode side, the electrode assembly will be referred to as a negative electrode assembly.

In the present invention, the thickness of the roughened layer on the surface of the aluminum foil is from 0.5 to 5 $\mu m$ on average. If it is less than 0.5 μm, the bond strength between the electrode and the current collector tends to be poor. Particularly when the electrode is preliminarily formed into a sheet, followed by bonding to the current collector, the bond strength tends to be weak as the electrode sheet and the current collector will be bonded only at the surface of the current collector, whereby the bond strength tends to be poor. On the other hand, if it exceeds 5 μm, no further improvement in the bond strength tends to be observed, and the strength of the aluminum foil decreases as the thickness of the roughened layer increases. It is particularly preferably from 1 to 5 μm, more preferably from 2 to 4 μm.

In the present invention, in a case where an electrode is to be formed only on one side of the current collector, the surface-roughened layer may be formed only on the surface on one side of the aluminum foil which will be the bonding surface with the electrode. However, such a roughened layer may be formed on each side of the foil in order to form the surface-roughened layer continuously at a high speed and at a low cost on the aluminum foil.

In the present invention, the aluminum foil preferably has a breaking energy of at least 3 kg·mm, when it is punched out in a shape of a dumbbell specimen of No. 1 form as stipulated in JIS K6301, and the tensile strength is measured by a tensile tester by using the specimen. The breaking energy in the present invention is one obtained as an integrated value of an elongation (mm)/tensile load (kg) curve obtained by measuring the relation between the elongation of the above-mentioned specimen and the tensile load by a tensile tester. Here, the measuring conditions are such that the measuring temperature is room temperature (from 20 to 25° C.), the tensile speed is 5 mm/min, and the initial free length of the specimen between grips is 70 mm.

If the breaking energy of the aluminum foil is less than 3 kg·mm, the electrode assembly is likely to break by an external stress, for example, when the electrode and the current collector are to be bonded, when the electrode assembly is laminated or rolled to form a capacitor element, or when a lead is welded to the electrode assembly. Especially for an application where the capacitor is exposed to severe external vibration, the breaking energy of the aluminum foil of the current collector is preferably at least 4 kg·mm.

From the viewpoint of the strength, the larger the breaking energy, the better. However, to increase the breaking energy, the surface-non-roughened portion of the aluminum foil must be made thick, and accordingly, the proportion occupied by the current collector per a unit volume of the electric double layer capacitor, tends to increase, and the capacitance per unit volume (hereinafter referred to as the capacitance density) of the electric double layer capacitor tends to be small. Therefore, the breaking energy is preferably at most 15 kg·mm, particularly preferably at most 10 kg·mm.

In the present invention, the thickness of the non-roughened portion or layer of the aluminum foil as the current collector is preferably from 8 to 50 μm. If it is less than 8 μm, the electrode assembly is likely to break by an external stress, for example, when the electrode and the current collector are to be bonded, when the electrode assembly is laminated or rolled to form a capacitor element, or when a lead is welded to the electrode assembly. If it exceeds 50 μm, the proportion occupied by the current collector per unit volume of the electric double layer capacitor tends to be large, and the capacitance per unit volume (hereinafter referred to as the capacitance density) of the electric double layer capacitor tends to be small, whereby it tends to be difficult to satisfy the requirements for downsizing and weight reduction of the electric double layer capacitor. It is particularly preferably from 12 to 50 μm, more preferably from 15 to 35 μm.

Further, in the present invention, the aluminum foil is preferably a foil subjected to etching, and the weight reduction by the etching is preferably from 1 to 8 g/m². If the weight reduction by etching is less than 1 g/m², the bond strength between the electrode and the current collector tends to be weak. If the weight reduction by etching exceeds 8 g/m², no further improvement in the bond strength between the electrode and the current collector will be obtained, and the etching cost increases, thus leading to poor production efficiency. Further, the porosity of the roughened layer by etching tends to be too high, the mechanical strength of the roughened layer itself tends to decrease, whereby when the electrode and the current collector are bonded to form an electrode assembly, there may be a case where peeling is likely to occur at the interface between the roughened layer and the non-roughened portion or layer of the current collector. The weight reduction by etching is more preferably from 2 to 6 g/m², particularly preferably from 3 to 5 g/m².

The etched aluminum foil preferably has a capacitance of from 5 to 40 μF/cm². If the capacitance is less than 5 μF/cm², the adhesion strength of the electrode to the current collector tends to be low. On the other hand, if it exceeds 40 μF/cm², not only the adhesion strength of the electrode to the current collector tends to no longer increase, but also the mechanical strength of the aluminum foil itself tends to decrease as a current collector, whereby the etching speed will have to be reduced for forming the surface-roughened layer by continuous etching. Thus, the etching efficiency tends to be poor, and the amount of the etchant used, tends to increase, whereby the amount of by-product aluminum chloride tends to increase. From the viewpoint of the bond strength and the foil strength, the capacitance is particularly preferably from 10 to 30 μF/cm². Here, the capacitance means a capacitance in a non-anodized state.

In the present invention, as a method for etching the aluminum foil, three methods of alternating current etching, direct current etching and chemical etching, are available. By properly selecting the etchant composition, the temperature, the time, the frequency, the current density, and the multi-step etching technique, etc., foils having various roughened structures can continuously be produced on an industrial scale, which are different in the thickness of the surface-roughened layer, the density of etching pits of the aluminum foil and the capacitance of the surface-roughened layer.

In the case of alternating current etching, a sponge surface structure can be formed by carrying out the etching in accordance with the detailed description, for example, by R. S. Alwitt et al, in J. Electrochem. Soc., 128, 300–305 (1981) or Fukuoka et al, in Sumitomo Light Metal Technical Report, 205–212 (1993). By the alternating current etching, the diameters of etching pits on the surface of an aluminum foil can be made small, for example, by increasing the frequency, or by increasing the etching temperature.

A surface-roughened layer having a sponge porous structure formed by alternating current etching, and a layer having a so-called tunnel etching structure having pits formed in perpendicular to the thickness direction of the foil by applying direct current etching to an aluminum foil having the major portion of its surface occupied by oriented, (100) face, are known. As a typical structure of the roughened layer on the surface of the aluminum foil in the present invention, a roughened layer having a sponge porous structure is preferred.

When projected with 20,000 magnifications by an electron microscope, the surface of the aluminum foil constituting the current collector in the present invention, preferably has pits having pit diameters of substantially from 0.05 to 0.5 μm. Further, it preferably has from $5\times10^7$ to $3\times10^{10}$ pits having pit diameters of from 0.05 to 0.5 μm, per cm². It is particularly preferred that a cubic shape, a spherical shape or an intermediate shape thereof is the basic etching pit shape, and a sponge roughened structure is preferred. The total surface area by fine pits formed by etching will reflect the capacitance, but if the pit diameters are less than 0.05 μm, a binder or a conductive adhesive tends to hardly enter into the interiors of pits, whereby the bond strength between the electrode and the current collector tends to be low.

If the substantial pit diameters exceed 0.5 μm, the strength of the aluminum foil tends to be low, and in order to secure the strength, it will be necessary to reduce the number of pits, whereby the bond strength tends to be low, such being desirable. The pit diameters are particularly preferably from 0.08 to 0.3 μm. In this specification, the pit diameters represent the longest diameters of pits having the basic etching structures as observed with 20,000 magnifications by a microscope.

In the present invention, the sponge etching pits of the aluminum foil are preferably fine as described above, and the porosity by pits on the surface is preferably from 10 to 50%, as observed with 20,000 magnifications by an electron microscope. If the porosity by pits is less than 10%, the desired bond strength tends to be hardly obtainable, as the bonding area between the current collector foil and the binder in the electrode or the conductive adhesive present between the electrode and the current collector, tends to be small. If the porosity by pits exceeds 50%, the strength of the surface-roughened layer itself tends to be low, such being undesirable.

Further, if pits having pit diameters of from 0.05 to 0.5 μm are less than 5×10 pits per cm² of the projected area of the foil surface, the bonding strength tends to be inadequate. If the number of such pits exceeds $3\times10^{10}$, the strength of the surface-roughened layer itself tends to low. More preferably, it is from 5×10 to $1.5\times10^{10}$.

In the present invention, it is preferred to employ an aluminum foil having a purity of at least 99.9 wt %. To an aluminum foil for an aluminum electrolytic capacitor, it is common to enter or incorporate a component such as silicon, copper, manganese, magnesium or zinc. On the other hand, as a current collector for an electric double layer capacitor, an aluminum foil having a high purity is preferred. Particularly, the smaller the copper content, the better. The copper content is preferably at most 150 ppm, more preferably at most 80 ppm. Especially when the foil is used as a positive electrode current collector, if copper exceeds 150 ppm, it is likely that the copper elutes from the current collector during application of a voltage, thus leading to deterioration in the voltage maintaining property of the electric double layer capacitor, or increase of leakage current.

In the present invention, the purity of the aluminum foil may be higher than 99.999 wt %. However, taking refining into consideration, in the present invention, an aluminum foil with a purity of 3N of 99.9 wt % or 4N of 99.99 wt % can sufficiently preferably be used. Further, with a usual etched foil for cathode of an aluminum electrolytic capacitor, it is common to apply heat treatment to stabilize the capacitance. However, with an etched foil for the current collector of an electric double layer capacitor, it is preferred not to carry out post treatment after etching, since such post treatment is likely to bring about an increase of the contact resistance of the foil surface.

Aluminum foils are generally classified into a hard foil and a soft foil. The hard foil is one prepared by cold-rolling an aluminum original foil, followed by no heat treatment and has resiliency. Whereas, the soft foil is one obtained by annealing the aluminum foil at a temperature of from 300 to 400° C. during the preparation of the original foil or after etching to complete the primary recrystallization and is properly soft and excellent in extendability. In the present invention, in a case where an electric double layer capacitor element is prepared by rolling a pair of electrode assemblies with a separator interposed therebetween, the hard foil is preferred, since it is easy to handle and hardly undergoes plastic deformation by a tensile stress. While, in a case where an electric double layer capacitor element is prepared by using a part of the current collector as a lead portion and laminating a plurality of positive electrode assemblies and negative electrode assemblies with separators interposed among them, the soft foil is preferred, since the foil is deformed when a plurality of lead portions are welded all together, and the lead portions may scarcely break at such time.

In the present invention, the binder contained in the electrode is preferably at least one member selected from the group consisting of a polyvinylidene fluoride, a vinylidene fluoride/perfluoro(alkylvinyl ether) copolymer, a vinylidene fluoride/hexafluoropropylene copolymer and a chlorotrifluoroethylene/vinylene carbonate copolymer. In this specification, an A/B copolymer represents a copolymer comprising polymer units based on A and polymer units based on B. These binders are preferred, since they are more stable against a non-aqueous electrolyte for an electric double layer capacitor than conventional binders such as carboxymethyl cellulose, polyvinyl alcohol, polyvinyl pyrrolidone and polyacrylic acid, and they have high thermal stability and are electrochemically inactive. Among them, particularly preferred is a vinylidene fluoride/perfluoro (alkylvinyl ether) copolymer or a vinylidene fluoride/ hexafluoropropylene copolymer, since the bond strength can be made strong, and the strength of the layer made of the electrode can be increased. As the perfluoro(alkylvinyl ether), perfluoro(propylvinyl ether), perfluoro(ethylvinyl ether) or perfluoro(butylvinyl ether) may, for example, be mentioned.

Further, it is also preferred to use PTFE as the binder for the electrode. In such a case, the electrode assembly is preferably prepared by kneading the carbonaceous material and PTFE by an addition of a plasticizer such as ethanol, followed by rolling to form an electrode sheet, and connecting it electrically to the current collector via a conductive adhesive layer. By the above kneading, PTFE will be fibrillated, so that the electrode sheet will have a structure wherein the density of the electrode layer is high and the electrolyte is readily impregnated, and the electrode assembly can be maintained to have a high capacitance and low resistance. Further, the heat resistance of PTFE is high, and volatile impurities in the electrode element can be removed at a high temperature, whereby the voltage application durability or the voltage maintaining property of the capacitor can be made high.

Various types may be used as the conductive adhesive to electrically connect and integrate the electrode and the current collector. However, a conductive adhesive comprising colloidal graphite as a conductive material, and a thermosetting resin such as a polyimide resin or polyamidoimide resin as a binder, is preferred, since the heat resistance and oxidation resistance are particularly high, and the bond strength is high.

In the present invention, the electrode may contain a conductive material such as carbon black or graphite to lower the resistance. The conductive material is preferably contained in an amount of from 3 to 20 wt % in the electrode. When the electrode assembly is prepared by the above-described method, the conductive material is preferably added at the time of kneading the carbonaceous material and PTFE.

In the present invention, the electrode assembly may be prepared, for example, as follows, as a method other than the above-described method. The resin to be used as a binder is preferably employed in the form of a powder or varnish. The resin in such a form is dissolved in a solvent such as N-methyl-2-pyrrolidone (hereinafter referred to as NMP), and e.g. activated carbon powder or a conductive material is dispersed in this solution to obtain a slurry. This slurry is coated on the surface of a current collector by e.g. a die coater, a doctor blade or an applicator, and after preliminary drying, subjected to heat drying at a high temperature of at least 200° C., preferably at least 250° C., more preferably under reduced pressure, to form an electrode on the current collector. The electrode assembly thus obtained has the current collector and the electrode firmly bonded to each other.

In the present invention, the binder is preferably contained in an amount of from 3 to 30 wt % in the electrode. When the binder is contained in an amount of at least 3 wt % in the electrode, the practical strength of the electrode sheet can be obtained. However, if the binder is too much, the electrical resistance of the electrode tends to be large. Therefore, it is preferably at most 30 wt %. More preferably, it is from 5 to 15 wt %.

The organic electrolyte to be used for the electric double layer capacitor of the present invention is not particularly limited, and an organic electrolyte containing a salt dissociable into ions in a known organic solvent, can be used. It is particularly preferred to use an organic electrolyte having dissolved in an organic solvent a salt comprising a quaternary onium cation represented by e.g. $R^1R^2R^3R^4N^+$ or $R^1R^2R^3R^4P^+$ (wherein each of $R^1$, $R^2$, $R^3$ and $R^4$ which are the same or different, is an alkyl group) and an anion represented by e.g. $BF_4^-$, $PF_6^-$, $ClO_4^-$ or $CF_3SO_3^-$.

As the above organic solvent, a carbonate such as propylene carbonate, butylene carbonate, diethyl carbonate or ethyl methyl carbonate, a lactone such as γ-butyrolactone, sulfolane, or a solvent mixture thereof, can preferably be used.

As the separator for the electric double layer capacitor of the present invention, a cellulose paper, a cellulose/glass fiber mixed paper, a glass fiber sheet mat, a porous polypropylene sheet or a porous PTFE sheet may, for example, be used. Among them, preferred is a glass fiber mat having high heat resistance and low water content, or a cellulose paper of a low price, in the form of a thin film and having high strength.

For the electrode of the electric double layer capacitor of the present invention, any material may be employed so long as it is an electrochemically inactive material having a high specific surface area. However, one containing, as the main component, active carbon powder having a large specific surface area, is preferred. Other than the activated carbon powder, a material having a large specific surface area such as carbon black or polyacene may also be preferably used.

The electric double layer capacitor of the present invention can be obtained, for example, in such a manner that a pair of strip-shaped electrode assemblies are used as a positive electrode assembly and a negative electrode assembly, they are rolled with a strip-shaped separator interposed therebetween to obtain an element, which is then accommodated in a bottomed cylindrical casing, an organic electrolyte is impregnated to the element, and then the casing is sealed with a cover made of a thermosetting insulating resin and having a positive electrode terminal and a negative electrode terminal. At that time, the material for the casing is preferably aluminum, and a rubber ring is disposed along the periphery of the cover for curl-sealing.

Otherwise, an angular electric double layer capacitor may be formed, for example, in such a manner that a plurality of rectangular electrode assemblies are used as positive electrode assemblies and negative electrode assemblies, and they are alternately laminated with a separator interposed therebetween to form an element, which is then accommodated in a bottomed angular aluminum casing while taking out leads from the plurality of the positive electrode assemblies and the negative electrode assemblies, an organic electrolyte is impregnated to the above element, and then a cover having a positive electrode terminal and a negative electrode terminal, is attached to the casing, followed by sealing by e.g. laser welding. The electric double layer capacitor having an angular structure has a merit such that the volume efficiency is higher than the cylindrical type.

For the electric double layer capacitor of the present invention, both the positive electrode assembly and the negative electrode assembly may be electrode assemblies prepared by integrating the above-mentioned electrode comprising a carbonaceous material and a binder with the current collector made of an aluminum foil. However, it may be an electric double layer capacitor in which said electrode assembly is used only for the positive electrode side, and as the negative electrode, lithium metal, a lithium alloy or a material capable of absorbing and discharging lithium ions (such as graphite, amorphous carbon, polypyrrole or the like) is used. In this case, it is preferred to use a salt having a lithium ion as a cation, as the solute for the electrolyte.

Further, the current collector of the present invention is useful also as a current collector for e.g. a positive electrode for a lithium cell. For example, if as a positive electrode active material, a material capable of absorbing and discharging lithium ions, specifically e.g. $LiCoO_2$, $LiNiO_2$ or $LiMn_2O_4$, is dispersed in a solution containing a binder to form a slurry, and the slurry is coated on the current collector of the present invention to obtain a positive electrode assembly, the bond strength between the positive electrode and the current collector can be strengthened, and it is possible to obtain a lithium ion secondary cell excellent in cycle characteristics.

Further, heretofore, a polymer electrolyte rather than an electrolyte solution is used in an electric double layer capacitor as well as in a lithium cell, and in a case where a polymer electrolyte is incorporated also in the electrode to perform the role of a binder, the polymer electrolyte usually contain an electrolyte and a solvent as a plasticizer, whereby the polymer is swelled, and no adequate bond strength used to be obtained between the electrode and the current collector. Whereas, when the current collector of the present invention is used, the bonding between the electrode and the current collector can be improved, whereby it is possible to obtain an electric double layer capacitor or a secondary cell employing a polymer electrolyte, which is excellent in cycle characteristics.

As the polymer useful as a matrix of such a polymer electrolyte, a vinylidene fluoride/perfluoro(alkylvinyl ether) copolymer, a vinylidene fluoride/chlorotrifluoroethylene copolymer, a vinylidene fluoride/hexafluoropropylene/tetrafluoroethylene copolymer or a vinylidene fluoride/hexafluoropropylene copolymer, may, for example, be mentioned.

Now, the present invention will be described in further detail with reference to Examples (Examples 1 to 8 and 11) and Comparative Examples (Examples 9, 10 and 12). However, it should be understood that the present invention is by no means restricted by such specific Examples.

EXAMPLE 1

A hard aluminum foil having a purity of 99.9 wt % and a thickness of 30 $\mu$m, was subjected to countercurrent two-step etching using a mixed solution comprising hydrochloric acid, phosphoric acid, sulfuric acid and water, as an etching electrolyte, to obtain an aluminum foil having both sides roughened. The obtained foil had a thickness of 30 $\mu$m, wherein the thickness, per one side, of the roughened layer was 3 $\mu$m on average, and the thickness of the non-roughened portion was 24 $\mu$m. Further, the weight reduction by etching of this etched foil was 5.5 g/m$^2$.

The surface of the above aluminum foil was observed by a scanning electron microscope with 20,000 magnifications, whereby the surface was spongy, and etching pits had an average pit diameter of 0.1 $\mu$m. From the above aluminum foil, a dumbbell specimen of No. 1 form as stipulated in JIS K6301 was punched out and subjected to a tensile test, whereby the breaking energy was measured and found to be 4.50 kg·mm.

Into a stainless steel autoclave having an internal capacity of 1 lit. and equipped with a stirrer, 540 g of deionized water, 59.4 g of tert-butanol, 0.6 g of sec-butanol, 6 g of $C_8F_{17}CO_2NH_4$, 12 g of $Na_2HPO_4.12H_2O$, 6 g of ammonium persulfate, 0.009 g of $FeSO_4.7H_2O$, 11 g of EDTA.2H$_2$O (ethylenediamine tetraacetate dihydrate) and 21.3 g of $CF_2$=$CFOCF_2CF_2CF_3$ were charged, and after substituting the gas phase by nitrogen, 99.8 g of vinylidene fluoride was charged.

After raising the temperature to 25° C., an aqueous solution containing 1 wt % of $CH_2OHSO_2Na.2H_2O$ (Rongalit) was added at a rate of 21 ml/hr to carry out a polymerization reaction. Along with the progress of the reaction, the pressure decreases. Accordingly, in order to maintain the pressure at 23 atm, vinylidene fluoride was charged. Five hours later, the gas phase was purged to stop the polymerization and to obtain an emulsion having a concentration of 30 wt %. The emulsion was flocculated, followed by washing and drying to recover a vinylidene fluoride/$CF_2$=$CFOCF_2CF_2CF_3$ copolymer (95/5 by weight ratio).

100 parts by weight of a NMP solution containing 8 parts by weight of the above copolymer, was added to a mixture comprising 80 parts by weight of high purity activated carbon powder having an average particle size of 8 $\mu$m and a specific surface area of 1,800 m$^2$/g and 12 parts by weight of ketjenblack, followed by mixing by a ball mill to obtain a slurry having a solid content concentration of 26 wt %. This slurry was coated on one side of the above etched aluminum foil to form an electrode layer, followed by drying at 120° C. for 30 minutes and then press rolling, further drying at 180° C. for 30 minutes and then press rolling, to obtain an electrode assembly having a thickness of 100 $\mu$m.

From the above electrode assembly, two sheets of electrode assemblies each having an effective electrode area of 4 cm×6 cm, were obtained. Using them as a positive electrode assembly and a negative electrode assembly, an element was formed by disposing them to oppose each other via a glass fiber mat separator having a thickness of 160 $\mu$m so that the electrode layers faced each other. Then, vacuum drying was carried out at 190° C. for 5 hours to remove impurities. Then, as an electrolyte, a propylene carbonate solution having 1.5 mol/l of $(C_2H_5)_3(CH_3)NPF_6$ dissolved therein, was impregnated to this element under vacuum, and then, the element was accommodated in a polypropylene container to obtain an electric double layer capacitor.

After measuring the initial capacitance and the internal resistance of the obtained electric double layer capacitor, charging and discharging at a constant current of 1 A within from 0 to 2.5V in a constant temperature chamber of 45° C. were repeated for 50,000 cycles, and the capacitance and the internal resistance after the 50,000 cycles were measured, whereupon the performance change from the initial stage was examined, and the long term operation reliability of the electric double layer capacitor was evaluated in an accelerated manner. The initial capacitance was 6.3 F, the initial internal resistance was 0.24Ω, the capacitance after the cycle test was 6.0 F, the internal resistance after the test was 0.29Ω, the capacitance retaining ratio was 95%, and the increase of the internal resistance was 21%.

EXAMPLE 2

Using a soft aluminum foil having a purity of 99.9 wt % and a thickness of 40 $\mu$m, an aluminum foil having both sides surface-roughened, was obtained in the same manner as in Example 1 except that the conditions for alternate current etching of the aluminum foil in Example 1, i.e. the frequency, the current density, the temperature and the time for electrolysis, were changed. The obtained foil had a thickness of 40 $\mu$m, in which the thickness, per one side, of the roughened layer was 4 $\mu$m on average, and the thickness of the non-roughened portion was 32 $\mu$m. The weight reduction by etching of this foil was 4.2 g/m . By the inspection by a scanning electron microscope with 20,000 magnifications, the surface was spongy, and the etching pits had an average pit diameter of 0.1 $\mu$m. The breaking energy was measured in the same manner as in Example 1 and found to be 8.60 kg·mm.

80 Parts by weight of high purity activated carbon powder having an average particle size of 10 $\mu$m and a specific surface area of 1,800 m$^2$/g, 10 parts by weight of ketjenblack and 10 parts by weight of PTFE powder were mixed, and then propylene glycol was added, followed by molding by a screw extrusion molding method into a sheet, which was then subjected to rolling, followed by hot air drying for 30 minutes to remove propylene glycol, to obtain an electrode sheet having a thickness of 140 $\mu$m. This electrode sheet was inspected by a scanning electron microscope whereby, formation of numerous PTFE fibrils was observed. This electrode sheet was bonded on one side of the above current collector by means of a conductive adhesive using a polyamidoimide resin as a binder, followed by heat curing to obtain an electrode assembly having a thickness of 180 $\mu$m.

An element was formed in the same manner as in Example 1 except that the positive electrode assembly and the negative electrode assembly were obtained from the above electrode assembly, and an electric double layer capacitor was prepared in the same manner as in Example 1.

Using this electric double layer capacitor, evaluation was carried out in the same manner as in example 1, whereby the initial capacitance was 12 F, and the initial internal resistance was 0.22Ω. Further, the capacitance after the 50,000 cycles was 11.5 F, and the internal resistance was 0.25Ω. Thus, the capacitance retaining ratio was 96%, and the increase of the internal resistance was 14%.

Further, this electric double layer capacitor was charged with 2.5V for 100 hours and then left to stand for 30 days in an open-circuit state at 25° C., whereupon the holding voltage of the capacitor was 2.3V, and thus the voltage-holding property was good.

EXAMPLE 3

An electrode assembly was prepared in the same manner as in Example 1 except that instead of the vinylidene fluoride/$CF_2$=$CFOCF_2CF_2CF_3$ copolymer, a vinylidene fluoride/hexafluoropropylene copolymer (Kyner flex 2801, tradename, manufactured by Atochem K.K.) was incorporated as a binder in an amount of 8 wt % in the electrode layer, and the heating temperature was changed to 180° C., and the temperature for vacuum drying was changed to 150° C. An element was formed in the same manner as in Example 1 except that the positive electrode assembly and the negative electrode assembly were obtained from this electrode assembly, and an electric double layer capacitor was prepared in the same manner as in Example 1.

Using this electric double layer capacitor, evaluation was carried out in the same manner as in Example 1, whereby the initial capacitance was 6.5 F, the initial internal resistance was 0.24Ω, the capacitance after the 50,000 cycles was 6.2 F, and the internal resistance after the 50,000 cycles was 0.29Ω. Thus, the capacitance-retaining ratio was 95%, and the increase of the internal resistance was 21%.

EXAMPLE 4

Using the same hard aluminum foil as used in Example 1, an aluminum foil having a thickness of 30 μm and having, on each side, a roughened layer having a thickness of 4.1 μm on average, wherein the surface-non-roughened portion was 21.8 μm, was obtained in the same manner as in Example 1 except that the conditions for alternate current etching of the aluminum foil in Example 1, i.e. the frequency, the current density, the temperature and the time for electrolysis, were changed. The weight reduction by etching of this aluminum foil was 4.0 g/m². Further, by the inspection by a scanning electron microscope with 20,000 magnifications, the surface was spongy, and the etching pits had an average pit diameter of 0.07 μm. The breaking energy was measured in the same manner as in Example 1 and found to be 4.71 kg·mm.

An electrode assembly was prepared in the same manner as in Example 1 except that the above aluminum foil was used as the current collector. An element was formed in the same manner as in Example 1 except that the positive electrode assembly and the negative electrode assembly were obtained from this electrode assembly, and an electric double layer capacitor was prepared in the same manner as in Example 1.

Using this electric double layer capacitor, evaluation was carried out in the same manner as in Example 1, whereby the initial capacitance was 6.3 F, and the initial internal resistance was 0.24Ω. Further, the capacitance after the 50,000 cycles was 6.0F, and the internal resistance was 0.29Ω. Thus, the capacitance-retaining ratio was 95%, and the increase of the internal resistance was 20%.

EXAMPLE 5

A soft aluminum foil having an aluminum purity of at least 99.9 wt % and a copper content of 45 ppm and having a thickness of 30 μm, a width of 7 cm and a length of 10 cm, was subjected to alternate current two-step etching using as an etching electrolyte a mixed aqueous solution of hydrochloric acid/phosphoric acid/nitric acid/sulfuric acid/water= 10/1/4/0.1/84.9 (weight ratio), at a current density of 0.4 A/cm² at 45° C. with 35 Hz for the first step and at 0.3 A/cm at 25° C. with 25 Hz for the second step, to obtain an aluminum foil having both sides surface-roughened.

The obtained foil had a thickness of 29 μm, wherein the thickness per one side of the surface-roughened layer was 1.6 μm, and by the inspection by an electron microscope with 20,000 magnifications, the surface was spongy, and the etching pits had an average pit diameter of 0.1 μm, and pits present per 1 cm² were about 7×10⁹. The capacitance of the aluminum foil was 20 μF/cm An electrode assembly was prepared in the same manner as in Example 1 except that this current collector was employed, and an element was formed in the same manner as in Example 1 except that the positive electrode assembly and the negative electrode assembly were prepared from this electrode assembly. Then, an electric double layer capacitor was prepared in the same manner as in Example 1.

Using this electric double layer capacitor, the initial performance was evaluated in the same manner as in Example 1, whereby the initial capacitance was 6.5 F, and the initial internal resistance was 0.25Ω. Further, charging and discharging were repeated for 10,000 cycles at a constant current of 2 A within from 0 to 2.8V, and the capacitance after the 10,000 cycles was 16.2 F, and the internal resistance was 0.30Ω. Thus, the capacitance-retaining ratio was 95%, and the increase of the internal resistance was 20%.

EXAMPLE 6

Using an aluminum foil having a purity of at least 99.9 wt % and a copper content of 18 ppm and a thickness of 40 μm, a foil having both sides roughened, was obtained in the same manner as in Example 5 except that the frequency for the second step alternate current etching was changed to 27 Hz. The obtained foil had a thickness of 38 μm, wherein the thickness per one side of the roughened layer was 1.8 μm. By the inspection by an electron microscope with 20,000 magnifications, the surface was spongy, and the etching pits had an average pit diameter of 0.8 μm, and the number of pits present per cm² was about 9×10⁹. The aluminum foil had a capacitance of 25 μF/cm².

80 Parts by weight of high purity activated carbon powder having an average particle size of 10 μm and a specific surface area of 1,800 m²/g, 10 parts by weight of ketjenblack and 10 parts by weight of PTFE powder were mixed and then kneaded while dropwise adding ethanol, followed by molding into a sheet, which was then subjected to rolling to obtain a sheet having a thickness of 120 μm, which was then subjected to hot air drying at 200° C. for 30 minutes to remove ethanol and then bonded to each side of the above current collector by means of a conductive adhesive using a polyamideimide as a binder, followed further by heat curing at 230° C. for 30 minutes and pressing to obtain an electrode assembly having a thickness of 280 μm.

From the above electrode assembly, 44 sheets of electrode assemblies each having an effective area of 6.5 cm×12 cm, were obtained. Using 22 sheets as positive electrode assemblies and another 22 sheets as negative electrode assemblies, an element was prepared by laminating them alternately with a glass fiber mat separator having a thickness of 160 μm interposed. This laminate element was accommodated in a bottomed angular aluminum casing having a height of 13 cm, a width of 7 cm and a thickness of 2.2 cm, and sealed by laser welding with an aluminum cover provided with a positive electrode terminal and a negative electrode terminal, whereupon vacuum drying was carried out at 200° C. for 5 hours in such a state that the injection inlet was opened, to remove impurities. Then, as an electrolyte, a propylenecarbonate solution containing 1.5 mol/l of $(C_2H_5)_3(CH_3)NPF_6$ was impregnated to the element under vacuum, whereupon a safety valve was attached to the injection inlet to obtain an angular electric double layer capacitors. The initial capacitance was 1,600 F, and the internal resistance was 2.2 mΩ. After charging with 2.5V for 100 hours, the leakage current was 0.2 mA. After charging with 2.5V for 100 hours, it was left to stand for 30 days in an open-circuit state, whereupon the holding voltage of the capacitor was 2.3V, and thus, the voltage holding property was good.

Then, charging and discharging were repeated for 300,000 cycles at a constant current of 50 A within from 0 to 2.5V in a constant temperature chamber of 45° C., and the capacitance and the internal resistance after 300,000 cycles were measured and compared with the initial characteristics to evaluate the long term operation reliability of the capacitor in an accelerated manner. The capacitance-retaining ratio was 90%, and the increase of the internal resistance was 12%. Thus, the charging and discharging reliability at a large current was high.

EXAMPLE 7

An electric double layer capacitor was prepared in the same manner as in Example 3 except that the same current collector as used in Example 5 was used as the current collector, and the performance was evaluated in the same manner as in Example 1. The initial capacitance was 6.4 F, and the initial internal resistance was 0.25Ω. After the cycle test, the capacitance was 6.1 F, and the internal resistance was 0.35Ω.

EXAMPLE 8

An electric double layer capacitor element was prepared in the same manner as in Example 5 except that instead of the vinylidene fluoride/ $CF_2$=$CFOCF_2CF_2CF_3$ copolymer, a polyvinylidene fluoride was incorporated as a binder in an amount of 8 wt % in the electrode layer, and the heating temperature was changed to 180° C., and the temperature for vacuum drying was changed to 150° C. The performance was evaluated in the same manner as in Example 5. The initial capacitance was 6.1 F, and the initial internal resistance was 0.27Ω. After the cycle test, the capacitance was 5.5 F, and the internal resistance was 0.45Ω.

EXAMPLE 9

Using the same hard aluminum foil as used in Example 1, an aluminum foil having a thickness of 30 μm and having, on each side, a roughened layer having a thickness of 7 μm on average, wherein the non-roughened portion was 16 μm, was prepared in the same manner as in Example 1 except that the conditions for alternate current etching of the aluminum foil in Example 1, i.e. the frequency, the current density, the temperature and the time for electrolysis, were changed. The weight reduction by etching of this aluminum foil was 11.5 g/m². Further, by the inspection by a scanning electron microscope with 20,000 magnifications, the surface was spongy, and the etching pits had an average pit diameter of 0.08 μm. The breaking energy was measured in the same manner as in Example 1 and found to be 2.58 kg·mm.

An electrode assembly was prepared in the same manner as in Example 1 except that the above aluminum foil was used as the current collector, whereby the electrode assembly broke during the press rolling of the electrode assembly and was not practically useful.

EXAMPLE 10

An electrode assembly was prepared in the same manner as in Example 1 except that an aluminum foil having a thickness of 30 μm mechanically roughened by #600 sand paper, was used as the current collector. On the surface of the surface-roughened current collector, linear grooves having a depth of 7 μm and a width of from 4 to 15 μm were formed. The electrode assembly was normal when placed flatly, but when bent at an angle of 90°, the electrode peeled from the current collector. Using this electrode assembly, an electric double layer capacitor was prepared in the same manner as in Example 1, and the charging and discharging cycle test was carried out, whereby the capacitance-retaining ratio after the 10,000 cycles was 65%.

EXAMPLE 11

A vinylidene fluoride/$CF_2$=$CFOCF_2CF_2CF_3$ copolymer (89/11 by weight ratio) was obtained in the same manner as in Example 1 except that in Example 1, the amount of $CF_2$=$CFOCF_2CF_2CF_3$ charged, was changed to 40.5 g. This copolymer was dissolved in tetrahydrofuran (hereinafter referred to as THF) in an argon atmosphere under heating with stirring. This solution was designated as solution 1. Then, $LiPF_6$ was dissolved in a concentration of 1 mol/l in a solvent mixture of ethylene carbonate and propylene carbonate in a volume ratio of 1/1, and the solution was designated as solution 2.

To 21 g of solution 1, 5 g of solution 2 was added, followed by heating to 60° C. and stirring. This solution was coated on a glass plate by a bar coater and dried at 40° C. for 1 hour to remove tetrahydrofuran thereby to obtain a transparent polymer electrolyte film having a thickness of 100 μm. The composition of this film was such that the above-mentioned copolymer, the ethylene carbonate/propylene carbonate solvent mixture and $LiPF_6$ were 48/46/6 by weight ratio.

11 g of $LiCoO_2$ powder having a particle diameter of 5 μm as a positive electrode active material, 1.5 g of acetylene black having a particle diameter of at most 0.01 μm as a conductive material, 6 g of the above-mentioned copolymer, 11 g of solution 2 and 70 g of THF were mixed in an argon atmosphere and heated with stirring to obtain a slurry. This slurry was coated on the same aluminum foil as used in Example 1 and dried to obtain a positive electrode assembly. This positive electrode assembly showed no abnormality such as peeling of the electrode from the current collector, even when bent at an angle of 180°.

12 g of mesophase carbon fiber powder as a negative electrode active material (average diameter: 8 μm, average length: 50 μm, spacing of (002) face: 0.336 nm), 6 g of the above-mentioned copolymer, 11 g of solution 2 and 70 g of THF were mixed in an argon atmosphere and heated with stirring to obtain a slurry. This slurry was coated on a copper foil having a thickness of 20 μm and having the surface sand-blasted, by a bar coater, and dried to obtain a negative electrode assembly.

The above-mentioned polymer electrolyte film was formed into a square of 1.5 cm×1.5 cm, and the positive electrode assembly and the negative electrode assembly each having an effective electrode area of 1 cm×1 cm were opposed with the electrolyte film interposed therebetween. Then, they were sandwiched and clamped by a pair of polytetrafluoroethylene plates each having a thickness of 1.5 mm and a size of 3 cm×3 cm, and further covered with an exterior film, and then accommodated in a polypropylene casing to assemble a lithium ion secondary cell.

The charging and discharging cycle test was carried out at a constant current of 0.5 C under such a potential regulation that the charging voltage was up to 4.2V, and the discharge voltage was up to 2.5V. As a result, the capacitance-retaining ratio after 500 cycles was 94%.

EXAMPLE 12

A positive electrode assembly was prepared in the same manner as in Example 11 except that the same current collector as used in Example 10, was used as the current collector for the positive electrode. The positive electrode assembly was normal when placed flatly, but the electrode was peeled from the current collector when bent at an angle of 90°. Using this positive electrode assembly, a lithium ion secondary cell was prepared in the same manner as in Example 11, and the charging and discharging cycle test was carried out in the same manner as in Example 11, whereby the capacitance-retaining ratio after 50 cycles was 50%.

With the electric double layer capacitor of the present invention, the operation performance is stable, and increase of the internal resistance of the electrode itself is little, even if a charging and discharging cycle is repeated at a large current density or even if a voltage is applied over a long period of time.

What is claimed is:

1. An electrode assembly for an electric double layer capacitor, comprising a current collector made of an aluminum foil, and an electrode comprising a carbonaceous material having a specific surface area of at least 500 m$^2$/g and a binder, bonded on at least one side of the current collector, wherein the aluminum foil has a roughened layer having a thickness of from 0.5 to 5 μm on the surface on the side bonded to the electrode, wherein a dumbbell specimen of the aluminum foil has a breaking energy of at least 3 kg·mm, and wherein the dumbbell specimen comprises a rectangular center that is 40 mm long and 10 mm wide, has two ends, and is bisected by a longitudinal axis; and two outer sections that are each 40 mm long, and are each connected to respective ends of the rectangular center, where each outer section comprises a rectangular portion and a junction portion;

the rectangular portion is 25 mm wide and 15 mm long;

the width of the rectangular portion is bisected by the longitudinal axis;

the junction portion has two sides arranged symmetrically on either side of the longitudinal axis;

each of the two sides varies smoothly along a first arc and a second arc from a first end 10 mm wide connected to the rectangular center to a second end 25 mm wide connected to the rectangular portion;

the first arc has a radius of 21 mm and is centered at a point 26 mm from the longitudinal axis along a line extending from the first end perpendicular to the longitudinal axis on the same side of the longitudinal axis as the first arc; and the second arc has a radius of 25 mm and is centered at a point 12.5 mm from the longitudinal axis along a line extending from the second end perpendicular to the longitudinal axis on the opposite side of the longitudinal axis as the second arc.

2. The electrode assembly for an electric double layer capacitor according to claim 1, wherein the thickness of the surface-roughened layer is from 1 to 5 μm.

3. The electrode assembly for an electric double layer capacitor according to claim 1, wherein the surface of the roughened layer has from $5 \times 10^7$ to $3 \times 10^{10}$ pits per cm$^2$ having pit diameters of from 0.05 to 0.5 μm.

4. The electrode assembly for an electric double layer capacitor according to claim 1, wherein the aluminum foil is subjected to etching so that the weight reduction is from 1 to 8 g/m$^2$.

5. The electrode assembly for an electric double layer capacitor according to claim 1, wherein the aluminum foil has a purity of at least 99.9 wt % and a copper content of at most 150 ppm.

6. The electrode assembly for an electric double layer capacitor according to claim 1, wherein the binder is a polytetrafluoroethylene, and the electrode is one formed to have a sheet shape.

7. The electrode assembly for an electric double layer capacitor according to claim 1, wherein the binder is at least one member selected from the group consisting of a polyvinylidene fluoride, a vinylidene fluoride/perfluoro (alkylvinyl ether) copolymer, a vinylidene fluoride/hexafluoropropylene copolymer and a chlorotrifluoroethylene/vinylene carbonate copolymer.

8. The electrode assembly for an electric double layer capacitor according to claim 1, wherein the electrode and the current collector are electrically connected via a conductive adhesive layer containing a thermosetting resin.

9. A method of making an electrode assembly, the method comprising bonding an electrode to a current collector; and forming the electrode assembly of claim 1.

10. An electrode assembly for an electric double layer capacitor, comprising a current collector made of an aluminum foil, and an electrode comprising a carbonaceous material having a specific surface area of at least 500 m$^2$/g and a binder, bonded on at least one side of the current collector, wherein the aluminum foil comprises a non-roughened portion having a thickness of from 8 to 50 μm and a roughened layer having a thickness of from 0.5 to 5 μm formed on one side or each side thereof, and wherein the surface of the roughened layer has from $5 \times 10^7$ to $3 \times 10^{10}$ pits per cm$^2$ having pit diameters of from 0.05 to 0.5 μm.

11. The electrode assembly for an electric double layer capacitor according to claim 10, wherein the aluminum foil is subjected to etching so that the weight reduction is from 1 to 8 g/m$^2$.

12. An electrode assembly for an electric double layer capacitor, comprising a current collector made of an aluminum foil, and an electrode comprising a carbonaceous material having a specific surface area of at least 500 m$^2$/g and a binder, bonded on at least one side of the current collector, wherein said aluminum foil comprises a non-roughened portion having a thickness of from 8 to 50 μm and a roughened layer having a thickness of from 0.5 to 5 μm formed on one side or each side thereof, and wherein the binder is a polytetrafluoroethylene, and the electrode is one formed to have a sheet shape.

13. A method of making an electrode assembly, the method comprising bonding an electrode to a current collector; and forming the electrode assembly of claim 10.

14. An electrode assembly for an electric double layer capacitor, comprising a current collector made of an aluminum foil, and an electrode comprising a carbonaceous material having a specific surface area of at least 500 m²/g and a binder, bonded on at least one side of the current collector, wherein the aluminum foil comprises a non-roughened portion having a thickness of from 8 to 50 μm and a roughened layer having a thickness of from 0.5 to 5 μm formed on one side or each side thereof, and wherein the electrode and the current collector are electrically connected via a conductive adhesive layer containing a thermosetting resin.

15. An electric double layer capacitor having an electrode assembly impregnated in an electrolyte, the electrode assembly comprising a current collector made of an aluminum foil, and an electrode comprising a carbonaceous material having a specific surface area of at least 500 m²/g and a binder, bonded on at least one side of the current collector, wherein the aluminum foil has a roughened layer having a thickness of from 0.5 to 5 μm on the surface on the side bonded to the electrode, wherein a dumbbell specimen of the aluminum foil has a breaking energy of at least 3 kg·mm, and wherein the dumbbell specimen comprises a rectangular center that is 40 mm long and 10 mm wide, has two ends, and is bisected by a longitudinal axis; and two outer sections that are each 40 mm long, and are each connected to respective ends of the rectangular center, where each outer section comprises a rectangular portion and a junction portion;

the rectangular portion is 25 mm wide and 15 mm long;

the width of the rectangular portion is bisected by the longitudinal axis;

the junction portion has two sides arranged symmetrically on either side of the longitudinal axis;

each of the two sides varies smoothly along a first arc and a second arc from a first end 10 mm wide connected to the rectangular center to a second end 25 mm wide connected to the rectangular portion;

the first arc has a radius of 21 mm and is centered at a point 26 mm from the longitudinal axis along a line extending from the first end perpendicular to the longitudinal axis on the same side of the longitudinal axis as the first arc; and the second arc has a radius of 25 mm and is centered at a point 12.5 mm from the longitudinal axis along a line extending from the second end perpendicular to the longitudinal axis on the opposite side of the longitudinal axis as the second arc.

16. The electric double layer capacitor according to claim 15, wherein the electrolyte is an organic electrolyte having dissolved in an organic solvent a salt comprising a quaternary onium cation represented by $R^1R^2R^3R^4N^+$ or $R^1R^2R^3R^4P^+$, wherein each of $R^1$, $R^2$, $R^3$ and $R^4$ which are the same or different, is an alkyl group, and an anion represented by $BF_4^-$, $PF_6^-$, $ClO_4^-$ or $CF_3SO_3^-$.

17. An electric double layer capacitor having an electrode assembly impregnated in an electrolyte, the electrode assembly comprising a current collector made of an aluminum foil, and an electrode comprising a carbonaceous material having a specific surface area of at least 500 m²/g and a binder, bonded on at least one side of the current collector, wherein the aluminum foil comprises a non-roughened portion having a thickness of from 8 to 50 μm and a roughened layer having a thickness of from 0.5 to 5 μm formed on one side or each side thereof, and wherein the electrode and the current collector are electrically connected via a conductive adhesive layer containing a thermosetting resin.

18. The electric double layer capacitor according to claim 11, wherein the electrolyte is an organic electrolyte having dissolved in an organic solvent a salt comprising a quaternary onium cation represented by $R^1R^2R^3R^4N^+$ or $R^1R^2R^3R^4P^+$, wherein each of $R^1$, $R^2$, $R^3$ and $R^4$ which are the same or different, is an alkyl group, and an anion represented by $BF_4^-$, $PF_6^-$, $ClO_4^-$ or $CF_3SO_3^-$.

19. A current collector made of an aluminum foil and having an electrode layer formed on at least one side thereof, wherein the aluminum foil has a roughened layer having a thickness of from 0.5 to 5 μm on the surface on the side bonded to the electrode, wherein a dumbbell specimen of the aluminum foil has a breaking energy of at least 3 kg·mm, and wherein the dumbbell specimen comprises a rectangular center that is 40 mm long and 10 mm wide, has two ends, and is bisected by a longitudinal axis; and two outer sections that are each 40 mm long, and are each connected to respective ends of the rectangular center, where each outer section comprises a rectangular portion and a junction portion;

the rectangular portion is 25 mm wide and 15 mm long;

the width of the rectangular portion is bisected by the longitudinal axis;

the junction portion has two sides arranged symmetrically on either side of the longitudinal axis;

each of the two sides varies smoothly along a first arc and a second arc from a first end 10 mm wide connected to the rectangular center to a second end 25 mm wide connected to the rectangular portion;

the first arc has a radius of 21 mm and is centered at a point 26 mm from the longitudinal axis along a line extending from the first end perpendicular to the longitudinal axis on the same side of the longitudinal axis as the first arc; and the second arc has a radius of 25 mm and is centered at a point 12.5 mm from the longitudinal axis along a line extending from the second end perpendicular to the longitudinal axis on the opposite side of the longitudinal axis as the second arc.

20. The current collector according to claim 19, wherein the aluminum foil further comprises a surface-non-roughened portion having a thickness of from 8 to 50 μm.

* * * * *